Patented July 19, 1949

2,476,779

UNITED STATES PATENT OFFICE 2,476,779

STABILIZED AROMATIC ISOCYANATES

Bernard Miller Sturgis, Pitman, N. J., assignor to E. I. du Pont de Nemours & Company, Wilmington, Del., a corporation of Delaware No Drawing. Application November 4, 1947, Serial No. 784,089

9 Claims. (Cl. 260—453)

This invention relates to aromatic isocyanates and particularly to aromatic isocyanate compositions which are stable against polymerization.

It is known that aromatic isocyanates are very reactive compounds. They not only react with a wide variety of other chemical compounds, but also react with themselves to form high molecular weight polymers. This polymerization rate varies with the isocyanate, but in most cases the isocyanates begin to polymerize soon after they are prepared, and within a short time deposit a quantity of insoluble polymeric material. Although certain impurities often act as catalysts for the polymerization, even highly purified aromatic isocyanates will polymerize on standing, and even so purification of the aromatic isocyanates is both cumbersome and expensive.

The polymer formation is undesirable for many reasons. Aromatic isocyanates are expensive chemicals, and when they polymerize they lose their value, for it is not known how to recover the monomeric aromatic isocyanate from the polymer. Since the isocyanates are often used in solution, the polymerization is a detriment because an insoluble precipitate is formed which must be removed, and the concentration of the active ingredient is continually changing. One of the important uses of the aromatic isocyanates is in rubber adhesive cements and the presence of isocyanate polymer in the rubber cement definitely lowers the adhesive strength of the cement.

It is the object of this invention to provide aromatic isocyanate compositions which will be stable against polymerization over extended periods of time, so that they can be transported and stored pending their utilization. Another object is to provide aromatic isocyanates having incorporated therein compounds which are soluble in the isocyanates and retard polymerization thereof without destroying the usefulness of the isocyanates. A further object is to provide solutions of aromatic isocyanates in inert organic solvents in which the isocyanates are stabilized against polymerization. A still further object is to provide a method of retarding the polymerization of aromatic isocyanates. Other objects are to provide new compositions of matter and to advance the art. Still other objects will appear hereinafter.

The above and other objects may be accomplished in accordance with my invention which comprises incorporating a small proportion of phosphorus trichloride, phosphorus pentachloride, or phosphorus oxychloride in an unsubstituted or substituted aromatic isocyanate. The substituted isocyanates to which my invention is applicable include those in which the only substituents other than hydrocarbon radicals and the isocyanate radicals are the hydrocarbonoxy radicals and halogen atoms. I have found that the above mentioned compounds of phosphorus are very effective and inhibit the polymerization of the above aromatic isocyanates over long periods of time and do not react with the isocyanates to destroy their usefulness. Thus the isocyanate containing the phosphorus compound may be employed in its usually desired application. My invention is applicable to the aromatic isocyanates, and particularly to the aromatic monoisocyanates and diisocyanates.

Generally for practical purposes the phosphorus compound is used in the proportion of 0.1% to 3% by weight based on the aromatic isocyanate. Smaller proportions of 0.05% or less may be used where the stabilization for a shorter time is desired. Amounts of 5% and more may be used, but larger amounts than 5% are usually without advantage.

The aromatic isocyanates may be stabilized in solutions of inert organic solvents or not as is desired. Such solvents which may be applicable include ortho-dichlorobenzene, kerosene, xylene, benzene, carbon tetrachloride, trichloro ethylene, chloro benzene, nitro benzene and the like. Mixtures of such solvents may also be used where they are compatible.

The stabilizers of my invention are effective on both crude and highly purified isocyanates. When the stabilizing action is no longer needed the agent may be separated by distillation, however the presence of the stabilizer does not interfere with the majority of the uses of the isocyanate.

In order to more clearly illustrates my invention, preferred modes of carrying the same into effect and advantageous results to be obtained thereby, the following examples are given; all parts are by weight unless otherwise specified:

Example I

A sample of freshly made methylene-bis (4-phenyl isocyanate) was purified by distilling at 1–2 mm. pressure, a 10% first fraction being discarded. The resulting isocyanate was a white crystalline product melting at 42–43° C. This was made into a 50% solution in dried ortho-dichlorobenzene. Portions of this solution were placed in Pyrex glass tubes which were stoppered and stored at room temperature. The isocyanate in several of the tubes was stabilized by the addition of small amounts of phosphorus chlorides or oxychloride.

| Stabilizer | Amount Based on Isocyanate | Days to First Appearance of Polymer |
|---|---|---|
| | Per cent | |
| None | | 1 day. |
| Phosphorus trichloride | 1 | None after 80 days. |
| Phosphorus oxychloride | 1 | Do. |
| Phosphorus pentachloride | 1 | None after 25 days. |
| Phosphorus trichloride | 0.25 | Do. |

Example II

Portions of the distilled methylene-bis (4 phenyl isocyanate) of Example I were dissolved in dried benzene and kerosene to form 50% solutions. Each solution was divided into two parts, one part in each case being stabilized with 1% phosphorus trichloride based on the isocyanate. The samples were stored in stoppered Pyrex tubes at room temperature.

| Solvent | Stabilized | Days to First Appearance of Polymer |
|---|---|---|
| Benzene | No | 1 day. |
| Do | Yes | None after 25 days. |
| Kerosene | No | 1 day. |
| Do | Yes | None after 25 days. |

Example III

Samples of a-naphthyl isocyanate, phenyl isocyanate, and p-phenetyl isocyanate were dissolved in dried ortho-dichlorobenzene to form 50% solutions. These solutions were each divided into two parts. To one part of each solution was added 1% phosphorus trichloride based on the isocyanate. The solutions were stored in stoppered Pyrex tubes at room temperature.

| Isocyanate | Stabilized | Days of First Appearance of Polymer |
|---|---|---|
| a-Naphthyl isocyanate | No | 6 days. |
| Do | Yes | None after 25 days. |
| Phenyl isocyanate | No | 2 days. |
| Do | Yes | None after 25 days. |
| p-Phenetyl isocyanate | No | 2 days. |
| Do | Yes | None after 25 days. |

Example IV

A sample of crude methylene-bis (4-phenyl isocyanate), analyzing 86% isocyanate, was used for this experiment. This material was in the form of a black, viscous liquid, and was prepared by the phosgenation of p,p'-diamino diphenyl methane followed by heating. This sample was divided into four portions which were treated as described below and stored at room temperature. At frequent intervals, part of each portion was filtered, and the residual polymer dried and weighed.

| Sample | Days to First Appearance of Polymer |
|---|---|
| Isocyanate | 1 day. |
| Isocyanate+1% PCl₃ | None after 25 days. |
| 50% isocyanate in orthodichlorobenzene | 1 day. |
| 50% Isocyanate in orthodichlorobenzene+1% PCl₃ | None after 25 days. |

It will be understood that the preceding examples are given for illustration purposes only and that my invention is not to be limited to the specific embodiments therein disclosed. Many variations and modifications can be made in the isocyanates treated, the organic solvents, the proportions and degree of concentration in the solvents and the modes of admixing the compounds of phosphorus with the aromatic isocyanate.

The aromatic isocyanates, which may be treated in accordance with my invention, are those which have at least one isocyanate group attached to the aromatic ring. Other substituents in the aromatic ring include hydrocarbon and hydrocarbonoxy groups and halogens. Further examples of aromatic isocyanates to which this invention is applicable are meta-phenylene diisocyanate, para-phenylene diisocyanate, 2-methyl-1,4-phenylene diisocyanate, 2-chloro phenyl isocyanate, 4-phenyl phenyl isocyanate, 4-benzyl phenyl isocyanate, 2,4-tolylene diisocyanate, 4,4',4''-triisocyano triphenyl methane, 1 chloro-2,4-phenylene diisocyanate, etc. Of these, the phenylene diisocyanates, particularly 2,4-tolylene diisocyanate, are preferred.

From the foregoing it will be apparent that by my invention, I have provided aromatic isocyanate compositions which do not tend to polymerize, but are stable over long periods of time. In most instances, the small amount of stabilizer will not interfere with the normal reactions of the isocyanate and moreover can be removed by distillation if desired.

I claim:

1. An aromatic isocyanate in which at least one isocyanate radical is attached to the aromatic ring of the group consisting of the unsubstituted and substituted carbocyclic aromatic isocyanates in the latter of which the only substituents other than hydrocarbon radicals and isocyanate radicals are from the group consisting of hydrocarbonoxy radicals and halogen atoms, having admixed therewith a small amount of a compound selected from the group consisting of phosphorus trichloride, phosphorus pentachloride, and phosphorus oxychloride.

2. An aromatic isocyanate in which at least one isocyanate radical is attached to the aromatic ring of the group consisting of the unsubstituted and substituted carbocyclic aromatic isocyanates in the latter of which the only substituents other than hydrocarbon radicals and isocyanate radicals are from the group consisting of hydrocarbonoxy radicals and halogen atoms, having admixed therewith 0.05% to 5% by weight based on the aromatic isocyanate of of a compound selected from the group consisting of phosphorus trichloride, phosphorus pentachloride, and phosphorus oxychloride.

3. An aromatic monoisocyanate in which the isocyanate radical is attached to the aromatic ring of the group consisting of unsubstituted and substituted carbocyclic aromatic monoisocyanates in the latter of which the only substituents other than hydrocarbon radicals and isocyanate radical are from the group consisting of hydrocarbonoxy radicals and halogen atoms, having admixed therewith 0.05% to 5% based on the aromatic monoisocyanate of a compound selected from the group consisting of phosphorus trichloride, phosphorus pentachloride, and phosphorus oxychloride.

4. An aromatic diisocyanate in which at least one isocyanate radical is attached to the aromatic ring of the group consisting of unsubstituted and substituted carbocyclic aromatic diisocyanates in the latter of which the only substituents other than hydrocarbon radicals and isocyanate radicals are from the group consisting of hydrocarbonoxy radicals and halogen atoms, having admixed therewith 0.05% to 5% by weight based on the aromatic diisocyanate of a compound selected from the group consisting of phosphorus trichloride, phosphorus pentachloride, and phosphorus oxychloride.

5. Methylene-bis (4-phenyl isocyanate) having admixed therewith 0.05% to 5% by weight of a compound selected from the group consisting of phosphorus trichloride, phosphorus pentachloride, and phosphorus oxychloride.

6. A solution of an aromatic isocyanate in which at least one isocyanate radical is attached to the aromatic ring of the group consisting of unsubstituted and substituted carbocyclic aromatic isocyanate in the latter of which the only substituents other than the hydrocarbon radicals and isocyanate radicals are from the group consisting of hydrocarbonoxy radicals and halogen atoms, in an inert organic solvent, and having admixed therewith 0.05% to 5% by weight based on the aromatic isocyanate of a compound selected from the group consisting of phosphorus trichloride, phosphorus pentachloride, and phosphorus oxychloride.

7. A solution of an aromatic monoisocyanate in which the isocyanate radical is attached to the aromatic ring of the group consisting of unsubstituted and substituted carbocyclic aromatic monoisocyanates in the latter of which the only substituents other than hydrocarbon radicals and the isocyanate radical are from the group consisting of hydrocarbonoxy radicals and halogen atoms, in an inert organic solvent, and having admixed therewith 0.05% to 5% by weight based on the aromatic monoisocyanate of a compound selected from the group consisting of phosphorus trichloride, phosphorus pentachloride, and phosphorus oxychloride.

8. A solution of an aromatic diisocyanate in which at least one isocyanate radical is attached to the aromatic ring of a group consisting of unsubstituted and substituted carbocyclic aromatic diisocyanates in the latter of which the only substituents other than hydrocarbon radicals and the isocyanate radicals are from the group consisting of hydrocarbonoxy radicals and halogen atoms, in an inert organic solvent, and having admixed therewith 0.05% to 5% by weight of a compound selected from the group consisting of phosphorus trichloride, phosphorus pentachloride, and phosphorus oxychloride.

9. A solution of methylene-bis (4-phenyl isocyanate), in an inert organic solvent, and having admixed therewith 0.05% to 5% by weight based on the isocyanate of a compound selected from the group consisting of phosphorus trichloride, phosphorus pentachloride, and phosphorus oxychloride.

BERNARD MILLER STURGIS.

REFERENCES CITED

The following references are of record in the file of this patent:

UNITED STATES PATENTS

| Number | Name | Date |
|---|---|---|
| 2,437,867 | Verbanc | Mar. 16, 1948 |